United States Patent
Xia

(10) Patent No.: US 10,677,607 B2
(45) Date of Patent: Jun. 9, 2020

(54) BLOCKCHAIN-BASED CROWDSOURCING OF MAP APPLICATIONS

(71) Applicant: Alibaba Group Holding Limited, George Town (KY)

(72) Inventor: Ning Xia, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/421,395

(22) Filed: May 23, 2019

(65) Prior Publication Data
US 2019/0301883 A1    Oct. 3, 2019

Related U.S. Application Data

(63) Continuation of application No. PCT/CN2018/125637, filed on Dec. 29, 2018.

(51) Int. Cl.
| | |
|---|---|
| *G01C 21/36* | (2006.01) |
| *G06Q 50/00* | (2012.01) |
| *H04L 9/06* | (2006.01) |
| *G06Q 30/02* | (2012.01) |
| *H04L 9/32* | (2006.01) |
| *G06Q 10/10* | (2012.01) |

(52) U.S. Cl.
CPC ........... *G01C 21/367* (2013.01); *G06Q 10/10* (2013.01); *G06Q 30/02* (2013.01); *G06Q 30/0205* (2013.01); *G06Q 50/01* (2013.01); *H04L 9/0637* (2013.01); *H04L 9/0643* (2013.01); *H04L 9/3239* (2013.01); *H04L 2209/38* (2013.01)

(58) Field of Classification Search
None
See application file for complete search history.

(56) References Cited

U.S. PATENT DOCUMENTS

| | | |
|---|---|---|
| 2011/0246148 A1 | 10/2011 | Gupta et al. |
| 2018/0091596 A1 | 3/2018 | Alvarez et al. |
| 2018/0356236 A1* | 12/2018 | Lawrenson ............ G01C 21/32 |

FOREIGN PATENT DOCUMENTS

WO    WO 2017180382    10/2017

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
(Continued)

*Primary Examiner* — Navid Ziaeianmehdizadeh
(74) *Attorney, Agent, or Firm* — Fish & Richardson P.C.

(57) ABSTRACT

Map data is received at a map-service provider associated with a blockchain from a data collector. The map data is transmitted to a data-service provider for processing. Non-crowdsourced data is received at the map-service provider from a data provider. The non-crowdsourced data is transmitted to the data-service provider for processing with the map data. A request is received for processed map data from a service user. The processed map data that is generated from the map data and the non-crowdsourced data is retrieved from the data-service provider. The processed map data is transmitted to the service user in response to the request.

15 Claims, 5 Drawing Sheets

(56) References Cited

OTHER PUBLICATIONS

PCT International Search Report and Written Opinion in International Application No. PCT/CN2018/125637, dated Sep. 19, 2019, 6 pages.
European Extended Search Report in European Patent Application No. 18866758.8 dated Feb. 5, 2020, 8 pages.
Meech, Streetcred.co [Online], "We Have Some Blocksplaining to Do," Jul. 2018, [Retrieved on Jan. 27, 2020], retrieved from: URL <https://www.streetcred.co/blog/2018/7/16/we-have-some-blocksplaining-to-do/>, 10 pages.
Streetcred Team, streetcred.co [Online], "4 Days, 500+ User, 3000+ Places," Sep. 2018, [Retrieved on Jan. 27, 2020], retrieved from: URL <https://www.streetcred.co/blog/2018/9/28/4-days-500-users-3000-places/>, 5 pages.

\* cited by examiner

BLOCKCHAIN-BASED CROWDSOURCING OF MAP APPLICATIONS

CROSS-REFERENCE TO RELATED APPLICATIONS

This application is a continuation of PCT Application No. PCT/CN2018/125637, filed on Dec. 29, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

The collection of map data is extremely resource intensive for map application providers, and users often complain that collected map data is not current enough for their needs. Although conventional map data collection can be used for addressing these issues, a more efficient solution to address map data collection would be advantageous.

SUMMARY

Implementations of the specification include computer-implemented methods for blockchain-based crowdsourcing of data. More particularly, implementations of the specification are directed to providing a blockchain-based crowdsourcing platform capable of collecting and providing map data.

In some implementations, actions include receiving, at a map-service provider associated with a blockchain, map data from a data collector; transmitting the map data to a data-service provider for processing; receiving, at the map-service provider, non-crowdsourced data from a data provider; transmitting the non-crowdsourced data to the data-service provider for processing with the map data; receiving, a request for processed map data from a service provider; retrieving, from the data-service provider, the processed map data that is generated from the map data and the non-crowdsourced data; and transmitting the processed map data to the service user in response to the request. Other implementations include corresponding systems, apparatus, and computer programs configured to perform the actions of the methods, encoded on computer storage devices.

These and other implementations may each optionally include one or more of the following features:

A first feature, combinable with any of the following features, wherein the map-service provider provides automated data consumption or data authorization for the service user.

A second feature, combinable with any of the following features, wherein the map-service provider, the data-service provider, and the data provider are computing devices participating in the blockchain.

A third feature, combinable with any of the following features, further comprising: prior to receiving the map data from the data collector, executing, by the map-service provider, a smart contract with the data collector.

A fourth feature, combinable with any of the following features, further comprising: prior to transmitting the map data to the data-service provider, executing, by the service provider, a smart contract with the data-service provider.

A fifth feature, combinable with any of the following features, wherein transmitting the map data to a data-service provider for processing includes transmitting the map data to a data-service provider for normalizing the map data or discarding irregular data from the map data.

A sixth feature, combinable with any of the following features, wherein the blockchain is a consortium blockchain.

A seventh feature, combinable with any of the following features, wherein the map data is collected by the data collector using crowdsourcing.

The specification also provides a non-transitory computer-readable storage medium coupled to one or more computers and having instructions stored thereon which are executable by the one or more computers to perform operations in accordance with implementations of the methods provided herein.

The specification further provides a system for implementing the methods provided herein. The system includes one or more computers, and one or more computer-readable memories coupled to the one or more computers and having instructions stored thereon which are executable by the one or more computers to perform operations in accordance with implementations of the methods provided herein.

It is appreciated that methods in accordance with the specification may include any combination of the aspects and features described herein. That is, methods in accordance with the specification are not limited to the combinations of aspects and features specifically described herein, but also include any combination of the aspects and features provided.

The details of one or more implementations of the specification are set forth in the accompanying drawings and the description below. Other features and advantages of the specification will be apparent from the description and drawings, and from the claims.

DESCRIPTION OF DRAWINGS

Like reference symbols in the various drawings indicate like elements.

DETAILED DESCRIPTION

Figure 1:
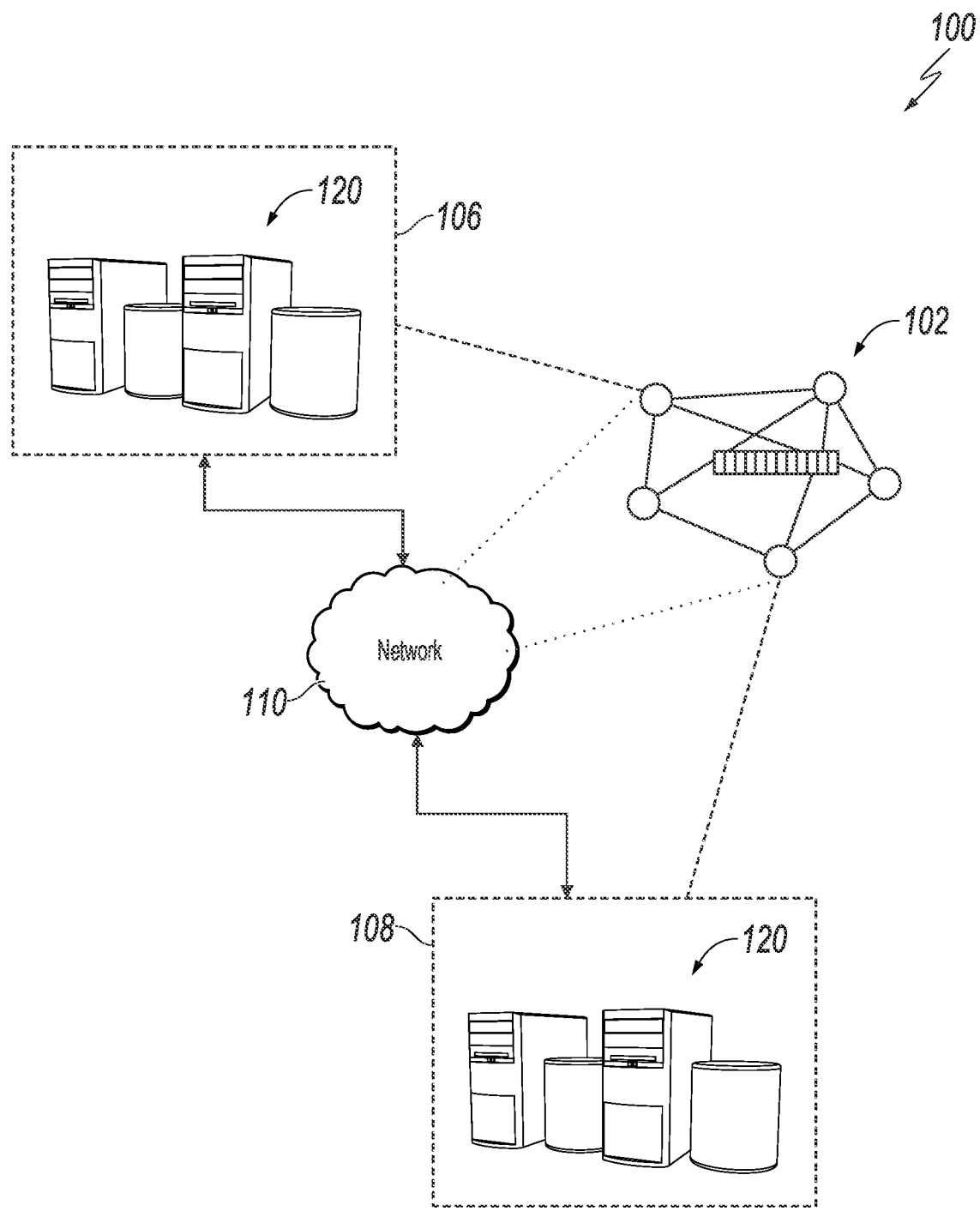
FIG. 1 depicts an example of an environment that can be used to execute implementations of the specification.

Implementations of the specification include computer-implemented methods for crowdsourcing service applications based on blockchain technologies. More particularly, implementations of the specification are directed to providing a blockchain-based crowdsourcing platform capable of collecting and providing map data.

To provide further context for implementations of the specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with currency networks, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Example public blockchain networks include particular peer-to-peer payment networks that leverage a distributed ledger, referred to as blockchain. As noted above, the term blockchain, however, is used to generally refer to distributed ledgers without particular reference to any particular blockchain network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. Example consensus protocols include, without limitation, proof-of-work (POW) (e.g., implemented in the some currency networks), proof-of-stake (POS), and proof-of-authority (POA). POW is referenced further herein as a non-limiting example.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the specification are described in further detail herein with reference to a consortium blockchain network, or a combination of two or more of a consortium blockchain network and a public or private blockchain network (hereinafter, a "blockchain network"). It is contemplated, however, that implementations of the specification can be realized in any appropriate type of blockchain network.

Implementations of the specification are described in further detail herein in view of the above context. More particularly, and as introduced above, implementations of the specification are directed to providing a blockchain-based crowdsourcing platform capable of collecting and providing map data.

FIG. 1 depicts an example of an environment 100 that can be used to execute implementations of the specification. In some examples, the example environment 100 enables entities to participate in a blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the blockchain network 102. In general the network 110 represents one or more communication networks.

In the depicted example, the computing systems 106, 108 can each include any appropriate computing system that enables participation as a node in the blockchain network 102. Example computing devices include, without limitation, a server, a desktop computer, a laptop computer, a tablet computing device, and a smartphone. In some examples, the computing systems 106, 108 hosts one or more computer-implemented services for interacting with the blockchain network 102. For example, the computing system 106 can host computer-implemented services of a first entity (e.g., Participant A), such as transaction management system that the first entity uses to manage its transactions with one or more other entities (e.g., other participants). The computing system 108 can host computer-implemented services of a second entity (e.g., Participant B), such as transaction management system that the second entity uses to manage its transactions with one or more other entities (e.g., other participants). In the example of FIG. 1, the blockchain network 102 is represented as a peer-to-peer network of nodes, and the computing systems 106, 108 provide nodes of the first entity, and second entity respectively, which participate in the blockchain network 102.

Figure 2:
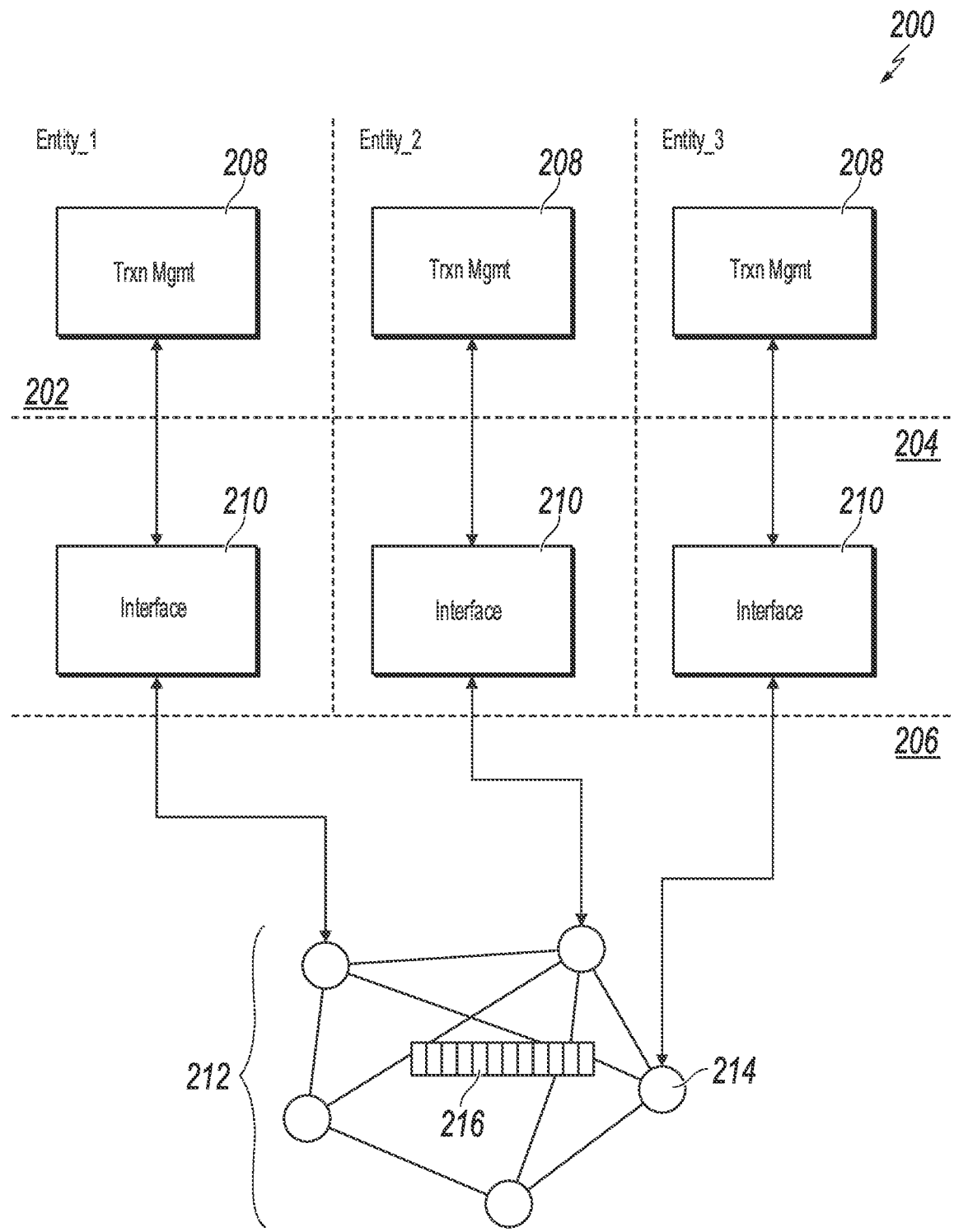
FIG. 2 depicts an example of a conceptual architecture in accordance with implementations of the specification.

FIG. 2 depicts an example of a conceptual architecture 200 in accordance with implementations of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216", 216''' of the blockchain 216.

A blockchain (e.g., the blockchain 216 of FIG. 2) is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and compete to have a block added to the blockchain. Such nodes are referred to as miners (or minder nodes). POW, introduced above, is used as a non-limiting example.

The miner nodes execute the consensus process to add transactions to the blockchain. Although multiple miner nodes participate in the consensus process, only one miner node can write the block to the blockchain. That is, the miner nodes compete in the consensus process to have their block added to the blockchain. In further detail, a miner node periodically collects pending transactions from a transaction pool (e.g., up to a predefined limit on the number of transactions that can be included in a block, if any). The transaction pool includes transaction messages from participants in the blockchain network. The miner node constructs a block, and adds the transactions to the block. Before adding the transactions to the block, the miner node checks whether any of the transactions are already included in a block of the blockchain. If a transaction is already included in another block, the transaction is discarded.

The miner node generates a block header, hashes all of the transactions in the block, and combines the hash value in pairs to generate further hash values until a single hash value is provided for all transactions in the block (the Merkle root hash). This hash is added to the block header. The miner also determines the hash value of the most recent block in the blockchain (i.e., the last block added to the blockchain). The miner node also adds a nonce value, and a timestamp to the block header. In a mining process, the miner node attempts to find a hash value that meets required parameters. The miner node keeps changing the nonce value until finding a hash value that meets the required parameters.

Every miner in the blockchain network attempts to find a hash value that meets the required parameters, and, in this way, compete with one another. Eventually, one of the miner nodes finds a hash value that meets the required parameters, and advertises this to all other miner nodes in the blockchain network. The other miner nodes verify the hash value, and if determined to be correct, verifies each transaction in the block, accepts the block, and appends the block to their copy of the blockchain. In this manner, a global state of the blockchain is consistent across all miner nodes within the blockchain network. The above-described process is the POW consensus protocol.

A non-limiting example is provided with reference to FIG. 2. In this example, Participant A wants to send an amount of currency to Participant B. Participant A generates a transaction message (e.g., including From, To, and Value fields), and sends the transaction message to the blockchain network, which adds the transaction message to a transaction pool. Each miner node in the blockchain network creates a block, and takes all transactions from the transaction pool (e.g., up to a predefined limit on the number of transaction that can be added to a block, if any), and adds the transactions to the block. In this manner the transaction published by Participant A is added to the blocks of the miner nodes.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Implementations of the specification are described in further detail herein in view of the above context. More particularly, and as introduced above, implementations of the specification are directed to blockchain-based crowdsourcing service applications. For the ease of description, the specification uses a map service as an example for illustration. However, the described subject matter can also be applied to other types of services, for example, a weather service or a supermarket product pricing inquiry service.

Conventional map applications have been and are used in many aspects associated with people's daily lives. For example, map applications can be used for planning travel, checking traffic conditions, and locating a point of interest (such as, a restaurant or a hospital). However, map data collection is one of the major challenges faced by map application providers, which creates difficulties for both map data providers and map service users. For example, traditional map service providers who collect data in a centralized manner are required to spend a large amount of resources (for example, personnel and computing resources) to collect and update map data. Meanwhile, map service users constantly complain because map data in their particular geographic regions is not timely or complete. For example, the map data usually fails to reflect a real-time road condition, especially when there are car accidents, road maintenance, or other road-related situations or emergencies. In addition, because of the lack of timely/complete collection capacity, map data providers usually cannot provide map data related to closed areas (such as, an indoor mall) with detailed subdivisions.

Crowdsourcing is a sourcing model through which goods and services can be obtained from a large group of people who submit data using, for example, the Internet, social media, or smartphone application. Crowdsourcing allows companies to farm work to people anywhere in the world. Compared to outsourcing, people involved in crowdsourcing work are less specific and more public. Crowdsourcing breaks tasks, usually large tasks, into many smaller subtasks that a crowd of people can work on separately. As such, companies using crowdsourcing models can save cost on human, material, and financial resources while improving efficiency and quality of work.

Some implementations of crowdsourcing functionalities exist. For example, GOOGLE MAP MAKER is an add-on product of GOOGLE MAPS that harnesses geographical contributions of users to complement existing content in GOOGLE MAPS. People from all over the world can now edit information on the GOOGLE MAPS application to achieve higher-accuracy. Similarly, the geographic information system (GIS) cloud crowdsourcing application is a project presented to the public as an interactive map, through which users can report a problem or observation. After users submit reports about a location or an asset, including photos and comments using a mobile or web application, a project coordinator can approve or reject submissions.

However, it is often difficult to gather data from a large number of users or members of an organization, and have all the gathered data centralized in one location, let alone to be able to organize the data, track the process of ongoing projects, and to report project status to the public and stakeholders. For example, to collect map data of a financial district under a traditional crowdsourcing approach, a map service provider needs to first advertise to the public and recruit a large number of available individuals to submit collected data. Such an approach has some potential issues that result from difficulties in forming trusted relationships between participants (such as service provider, data collector, data vendor, and data user) of the transaction, which can lead to prolonged transaction times and an extended overall process. For example, under the traditional approach, a service provider needs to spend a great amount of time looking for people who are capable of collecting data and to entering into individual contracts with one or more of data vendors and data service users to secure the business transactions. This results in a need to expend significant time and resources to each contracting party. Further, even if each party accepts specified terms of the contract, whenever a dispute occurs (for example, the service provider is not satisfied with the data received from the data collector and refuses to pay for the data), each dispute requires particular handling unique to the particular dispute. In such dispute scenarios, each party is required to spend valuable time and resources to resolve one or more disputes.

Therefore, existing solutions for crowdsourcing data collection are insufficient for a large number (for example, thousands) of data collectors, as well as data vendors and service providers in a secured and simplified data exchange and business transaction process, and using the same simple application for the same project or goal. Therefore, key challenges for using this type of crowdsourcing model for data collection is to find an efficient way to facilitate cooperation between data collectors and data service users (as well as other participants), prioritizing tasks, reducing response time, monitoring progress, and tracking details of performed transactions.

This disclosure describes a crowdsourcing service application based on blockchain technologies. Entities (such as data collectors, data service users, data providers, and service providers) participating in the transactions are bound by one or more smart contracts, which are computer agreements designed to disseminate, verify, or enforce contracts in an informational manner. Smart contracts are open to the public and can be executed automatically once entered, allowing trusted transactions to be performed without third-party involvement. In some implementations, the smart contract transactions are traceable and irreversible. For example, the service provider can set forth requirements for data needed in a smart contract and publish it to the public. Anyone from the public can accept the smart contract. Once a data collector fulfills all the requirements detailed in the smart contract (for example, submitting valid data to the service provider), the data collector can automatically receive a reward promised in the smart contract, leaving no possibility for the service provider to breach the smart contract. As such, business transactions can be carried out between contracting parties automatically and securely, reducing processing time and saving computing resources for each entity.

As an example, when a map-service provider needs to collect data associated with a financial district, instead of recruiting data collectors from the public and entering into individual contracts with each data collector, the map-service provider can form a blockchain and post a smart contract on the blockchain, soliciting individuals living close to the financial district to submit data. Any individual (not necessary to join the blockchain) who is aware of the smart contract can enter into a transaction with the map-service provider by accepting the terms of the smart contract, and receive payments automatically once data has been successfully submitted to the map-service provider. As such, the entire transaction process is simplified with a minimum level of human intervention that is needed to monitor each step of a transaction.

Figure 3:
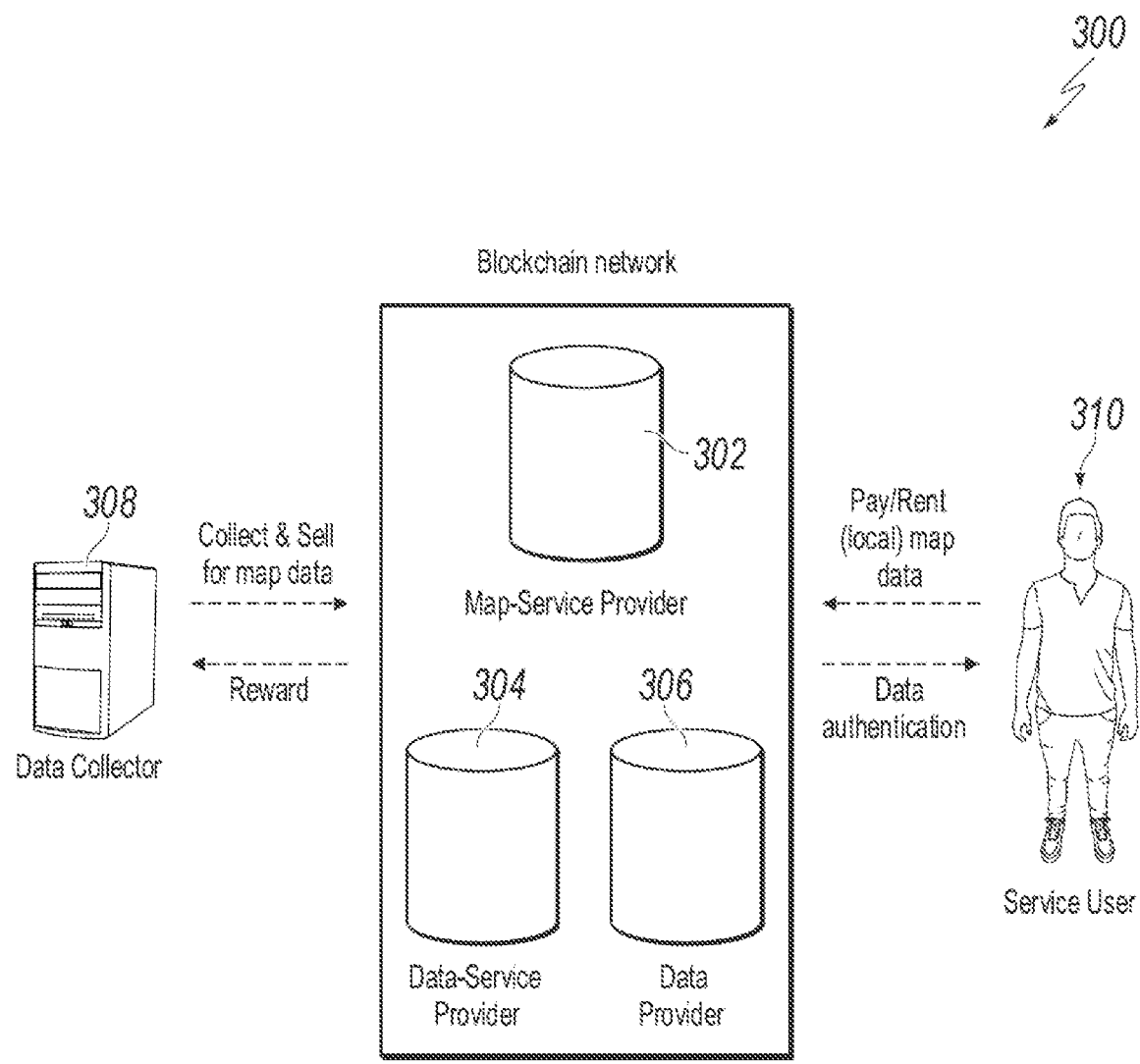
FIG. 3 depicts an example of a system environment of a blockchain-based crowdsourcing map application in accordance with implementations of the specification.

FIG. 3 depicts an example of a system environment 300 of a blockchain-based crowdsourcing map application in accordance with implementations of the specification. The map-service provider 302 can be any map service provider that is capable of forming a blockchain and executing smart contracts with individuals and data vendors (for example, data collectors and data providers). The formed blockchain can include the data-service provider 304 and data provider 306. The data-service provider 304 provides data services to the map-service provider 302, such as verifying or storing map data received from the map-service provider 302. The data provider 306 can provide additional information that cannot be collected through crowdsourcing to the map-service provider 302. Such data may include, for example, satellite images of a particular geographic region. The map-service provider 302 enters into a smart contract with each of the data-service provider 304 and the data provider 306, respectively, at the beginning of the process. Because of the existence of the smart contract, map-service provider 302 can execute a series of transactions, such as data consumption and data authorization with the data-service provider 304 and the data provider 306 automatically, reducing transaction costs to each entity.

For data that can be collected through crowdsourcing collection, such as traffic condition(s) of a specific geographic region, the map-service provider 302 can crowdsource the data collecting task to one or more data collectors 308. The data collector 308 collects data for the map-service provider 302 on the blockchain in exchange for a reward. For example, the data collector 308 can be any individual with the capacity to collect map data for a specific geographic region. Once a data collector 308 accepts a smart contract offered by the map-service provider 302, the data collector 308 collects map data using, for example, a global positioning system (GPS), dashboard cameras on a car, mobile computing devices, or drones, and sells the collected data to the map-service provider 302. After the submitted data is processed (such as verified and cleaned (for example, normalizing and removing irregular data) by the data-service provider 304, the map-service provider 302 can sell the processed data to a service user 310 who needs to buy or to rent the corresponding map data for a particular purpose.

Figure 4:
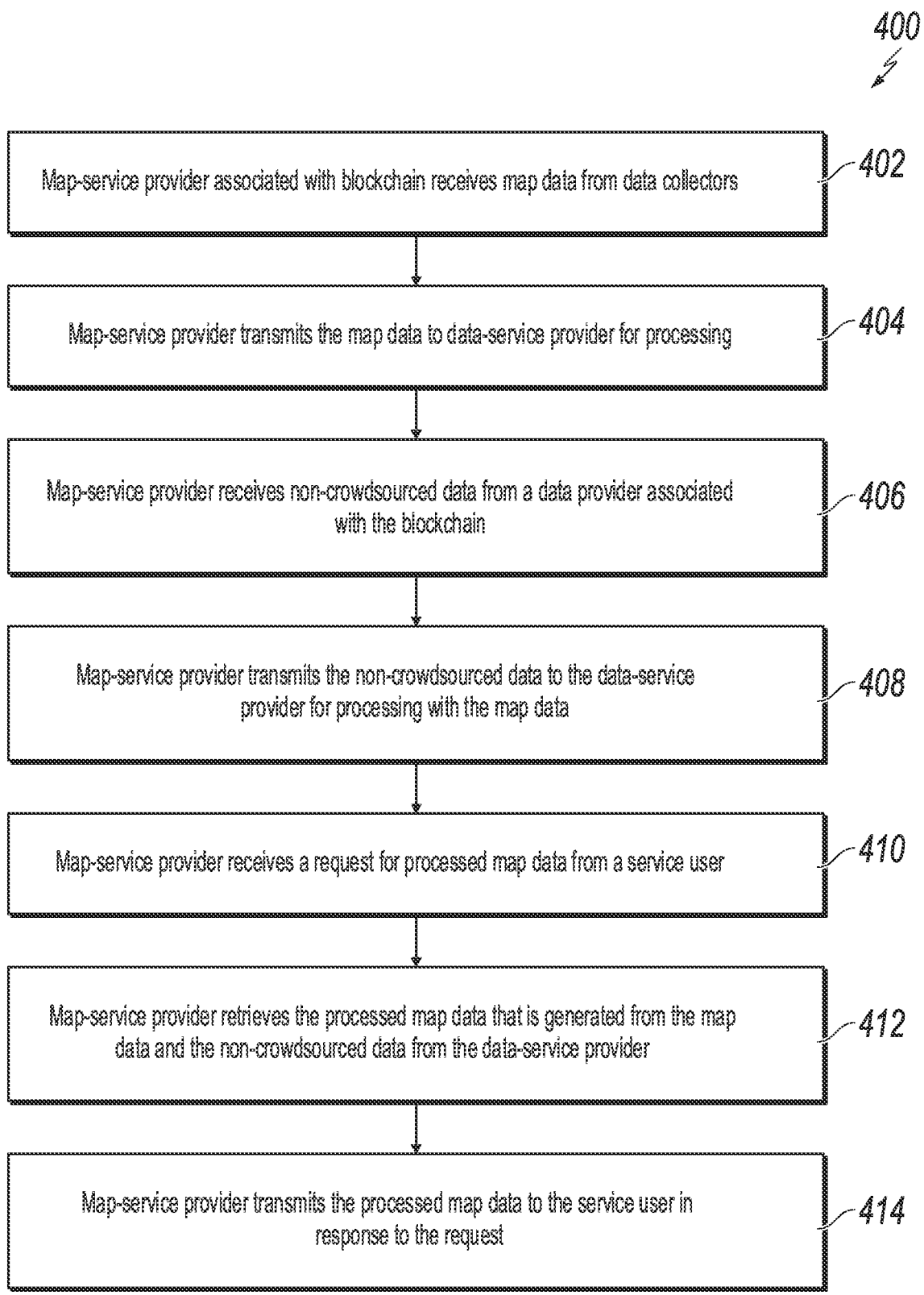
FIG. 4 depicts an example of a process that can be executed in accordance with implementations of the specification.

FIG. 4 depicts an example of a computer implemented method 400 that can be executed in accordance with implementations of the specification. In some implementations, the method 400 may be performed using one or more computer-executable programs executed using one or more computing devices. For clarity of presentation, the description that follows generally describes the method 400 in the context of the other figures in this description. However, it shall be understood that the method 400 may be performed, for example, by any suitable system, environment, software, hardware, or a combination of systems, environments, software, or hardware, as appropriate. In some implementations, various steps of the method 400 can be executed in parallel, in combination, in loops, or in any order.

At 402, a map-service provider associated with a blockchain receives map data from a plurality of data collectors. In some implementations, the blockchain can be a consortium blockchain. In some implementations, the map-service provider is an enterprise (for example, Alibaba) providing services to customers through software applications executing on mobile and non-mobile computing devices In some implementations, provided services can include a map service or a weather service. In some implementations, the map data is collected by the data collector using crowdsourcing.

In some implementations, the map-service provider receives data from the one or more data collectors through crowdsourcing. In some implementations, each data collector is a member of the public or a member of a group. In some implementations, data collectors can use GPS, a car dashboard camera, mobile computing device, or a drone to collect the data.

In some implementations, prior to receiving map data from the data collectors, the map-service provider executes a smart contract with one or more of the data collectors. The smart contract sets forth an incentive mechanism by which the one or more data collectors can receive a reward once they collect and submit relevant data to the map-service provider. In some implementations, the data can be validated to ensure that the data meets pre-set requirements of the map-service provider. For example, whether the data is collected from the actual data collector, useful, timely, or according to any other criteria. In some implementations, the pre-set requirements can be included in a smart contract. From 402, the method 400 proceeds to 404.

At 404, the map data is transmitted to a data-service provider for processing. In some implementations, prior to transmitting the map data to the data-service provider, the map-service provider executes a smart contract with the data-service provider to ensure transactions between the map-service provider and the data-service provider can be performed automatically.

In some implementations, transmitting the map data to a data-service provider for processing includes transmitting the map data to a data-service provider for normalizing the map data or discarding irregular data from the map data. For example, after a map-service provider receives batches of data for a specific geographic region from the one or more data collectors, the map-service provider can send the batches of data to the data-service provider, which can normalize the batches of data or compare each batch of data and remove any batches of data that contain irregular aspects (for example, corrupt, incomplete, or out-of-date). In some implementations, the data-service provider can also store the data for the map-service provider. From 404, method 400 proceeds to 406.

At 406, the map-service provider receives non-crowdsourced data from a data provider associated with the blockchain. The received non-crowdsourced data is data that cannot be collected (or is difficult to collect) through crowdsourcing. For example, the map-service provider may need information such as satellite images or aerial images of a targeted geographic region from non-data collectors. In some implementations, prior to receiving the non-crowdsourced data from the data provider, the map-service provider executes a smart contract with the data provider to ensure that transactions can be performed automatically. From 406, method 400 proceeds to 408.

At 408, the non-crowdsourced data is transmitted to the data-service provider for processing with the map data. From 408, method 400 proceeds to 410.

At 410, a request for processed map data is received from a service user. In some implementations, the service user can be a customer who needs to purchase or to rent data for a specific purpose, for example, receiving traffic condition updates for a route or requesting a detailed interior or exterior map of a building. From 410, method 400 proceeds to 412.

At 412, the processed map data that is generated from the map data and the non-crowdsourced data is retrieved from the data-service provider. In some implementations, prior to sending the processed data to the service user, the map-service provider executes a smart contract with the service user to ensure transactions between them can be performed automatically. After 412, method 400 proceeds to 414.

At 414, the processed map data is transmitted to the service user in response to the request. After 414, method 400 can stop.

Figure 5:
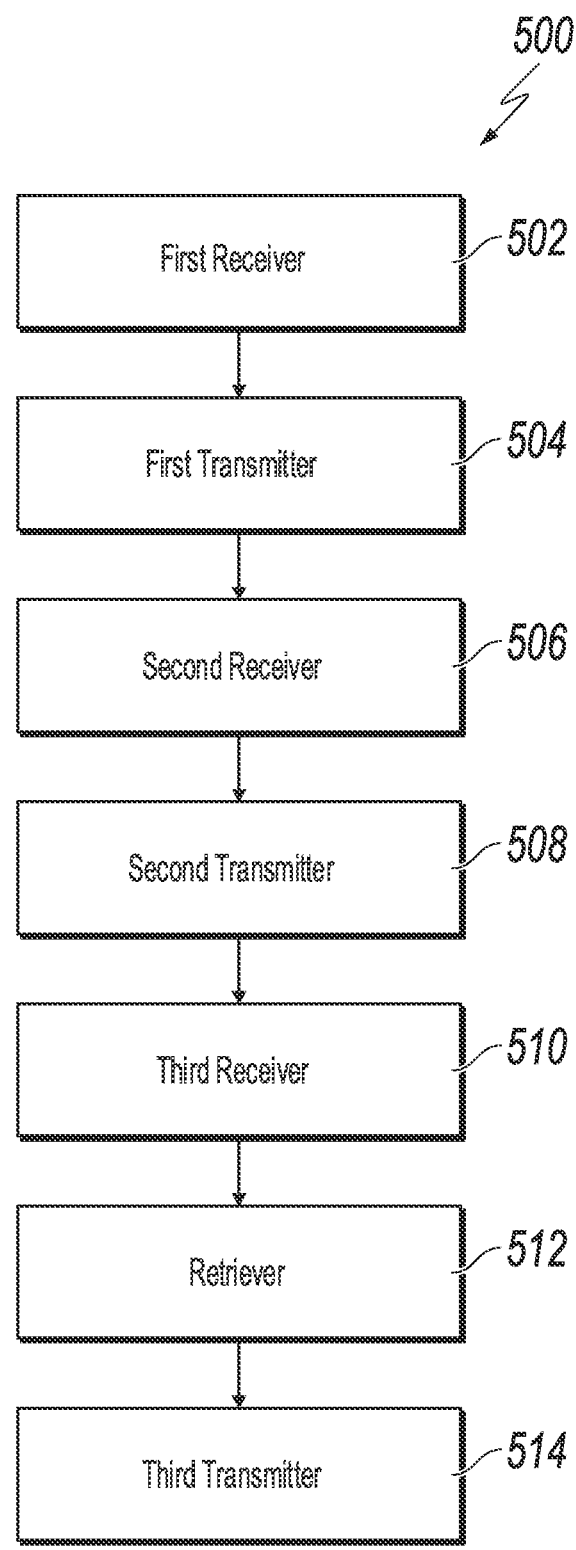
FIG. 5 depicts an example of modules of an apparatus 500 in accordance with implementations of this specification.

FIG. 5 depicts an example of modules of an apparatus 500 in accordance with implementations of this specification. The apparatus 500 can be an example implementation of an apparatus configured to enable blockchain-based crowdsourcing of data (such as, in a consortium or other blockchain-type network). The apparatus 500 can correspond to the implementations described above, and the apparatus 500 includes the following: A first receiver or first receiving unit 502 for receiving, at a map-service provider associated with a blockchain, map data from a data collector; a first transmitter or a first transmitting unit 504 for transmitting the map data to a data-service provider for processing; a second receiver or second receiving unit 506 for receiving, at the map-service provider, non-crowdsourced data from a data provider; a second transmitter or a second transmitting unit 508 for transmitting the non-crowdsourced data to the data-service provider for processing with the map data; a third receiver or third receiving unit 510 for receiving a request for processed map data from a service user; a retriever or a retrieving unit 512 for retrieving, from the data-service provider, the processed map data that is generated from the map data and the non-crowdsourced data; and a third transmitter or a third transmitting unit 514 for transmitting the processed map data to the service user in response to the request.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 5, it can be interpreted as illustrating an internal functional module and a structure of an apparatus for enabling blockchain-based crowdsourcing of data. The execution apparatus can be an example of an apparatus configured to enable blockchain-based crowdsourcing of data.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementation can also be realized in multiple implementations separately or in any suitable sub combination. Moreover, although features may be described above as acting in certain combinations and even initially be claimed as such, one or more features from a claimed combination can in some cases be excised from the combination, and the claim may be directed to a sub combination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
   executing, by a map-service provider, a first smart contract on a blockchain with a data collector, wherein the map-service provider and the data collector are computing devices participating in the blockchain;
   receiving, at the map-service provider, map data from the data collector;
   executing, by the map-service provider, a second smart contract on the blockchain with a data-service provider, wherein the data-service provider is a computing device participating in the blockchain;
   transmitting the map data to the data-service provider for processing;
   executing, by the map-service provider, a third smart contract on the blockchain with a data provider, wherein the data provider is a computing device participating in the blockchain;
   receiving, at the map-service provider, non-crowdsourced data from the data provider;
   transmitting the non-crowdsourced data to the data-service provider for processing with the map data;
   receiving a request for processed map data from a service user;
   retrieving, from the data-service provider, the processed map data that is generated from the map data and the non-crowdsourced data;
   executing, by the map-service provider, a fourth smart contract on the blockchain with the service user; and
   transmitting the processed map data to the service user in response to the request.

2. The computer-implemented method of claim 1, wherein the map-service provider provides automated data consumption or data authorization for the service user.

3. The computer-implemented method of claim 1, wherein transmitting the map data to the data-service provider for processing includes transmitting the map data to the data-service provider for normalizing the map data or discarding irregular data from the map data.

4. The computer-implemented method of claim 1, wherein the blockchain is a consortium blockchain.

5. The computer-implemented method of claim 1, wherein the map data is collected by the data collector using crowdsourcing.

6. A non-transitory, computer-readable medium storing one or more instructions executable by a computer system to perform operations comprising:
   executing, by a map-service provider, a first smart contract on a blockchain with a data collector, wherein the map-service provider and the data collector are computing devices participating in the blockchain;
   receiving, at the map-service provider, map data from the data collector;
   executing, by the map-service provider, a second smart contract on the blockchain with a data-service provider, wherein the data-service provider is a computing device participating in the blockchain;
   transmitting the map data to the data-service provider for processing;
   executing, by the map-service provider, a third smart contract on the blockchain with a data provider, wherein the data provider is a computing device participating in the blockchain;
   receiving, at the map-service provider, non-crowdsourced data from the data provider;
   transmitting the non-crowdsourced data to the data-service provider for processing with the map data;
   receiving a request for processed map data from a service user;
   retrieving, from the data-service provider, the processed map data that is generated from the map data and the non-crowdsourced data;
   executing, by the map-service provider, a fourth smart contract on the blockchain with the service user; and
   transmitting the processed map data to the service user in response to the request.

7. The computer-readable medium of claim 6, wherein the map-service provider provides automated data consumption or data authorization for the service user.

8. The computer-readable medium of claim 6, wherein transmitting the map data to the data-service provider for processing includes transmitting the map data to the data-service provider for normalizing the map data or discarding irregular data from the map data.

9. The computer-readable medium of claim 6, wherein the blockchain is a consortium blockchain.

10. The computer-readable medium of claim 6, wherein the map data is collected by the data collector using crowdsourcing.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       executing, by a map-service provider, a first smart contract on a blockchain with a data collector, wherein the map-service provider and the data collector are computing devices participating in the blockchain;
       receiving, at the map-service provider, map data from the data collector;
       executing, by the map-service provider, a second smart contract on the blockchain with a data-service provider, wherein the data-service provider is a computing device participating in the blockchain;
       transmitting the map data to the data-service provider for processing;
       executing, by the map-service provider, a third smart contract on the blockchain with a data provider, wherein the data provider is a computing device participating in the blockchain;
       receiving, at the map-service provider, non-crowdsourced data from the data provider;
       transmitting the non-crowdsourced data to the data-service provider for processing with the map data;

receiving a request for processed map data from a service user;

retrieving, from the data-service provider, the processed map data that is generated from the map data and the non-crowdsourced data;

executing, by the map-service provider, a fourth smart contract on the blockchain with the service user; and transmitting the processed map data to the service user in response to the request.

12. The system of claim 11, wherein the map-service provider provides automated data consumption or data authorization for the service user.

13. The system of claim 11, wherein transmitting the map data to the data-service provider for processing includes transmitting the map data to the data-service provider for normalizing the map data or discarding irregular data from the map data.

14. The system of claim 11, wherein the blockchain is a consortium blockchain.

15. The system of claim 11, wherein the map data is collected by the data collector using crowdsourcing.

* * * * *